(No Model.)  2 Sheets—Sheet 1.
E. B. PARKHURST.
ELECTRIC MOTOR.
No. 422,149.  Patented Feb. 25, 1890.
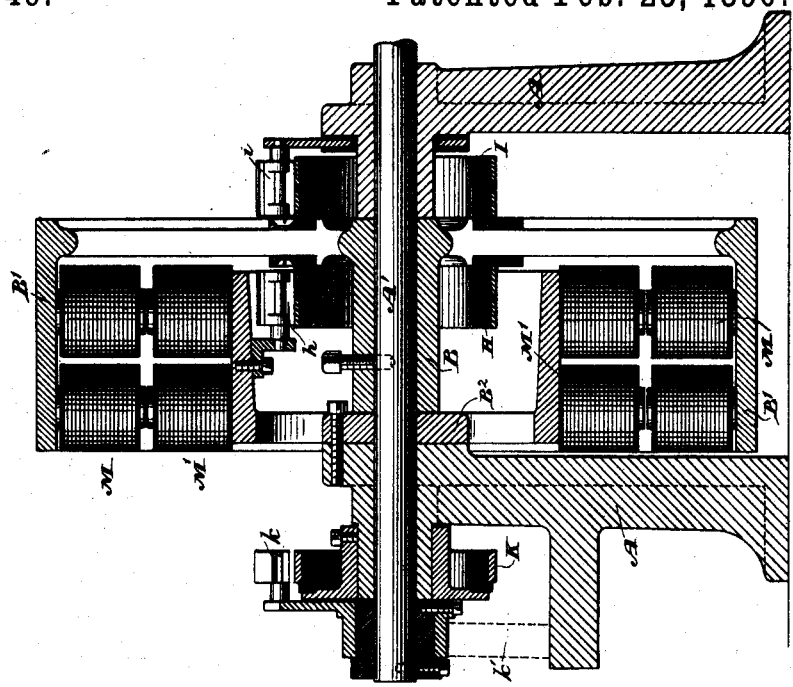
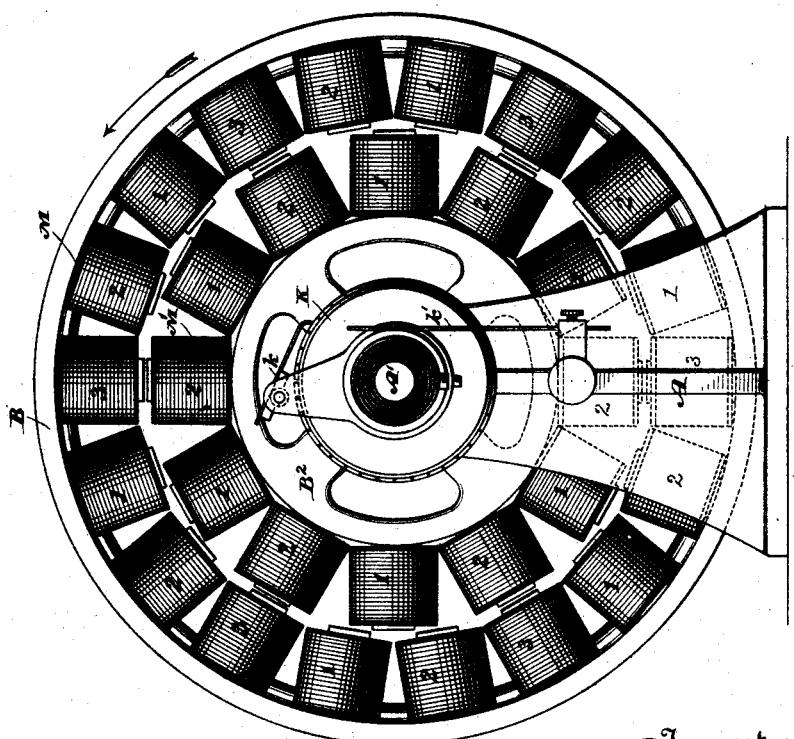
Witnesses
Geo. W. Breck
C. E. Ashley
Inventor
Edward B. Parkhurst
By his Attorneys
Baldwin, Davidson & Wight

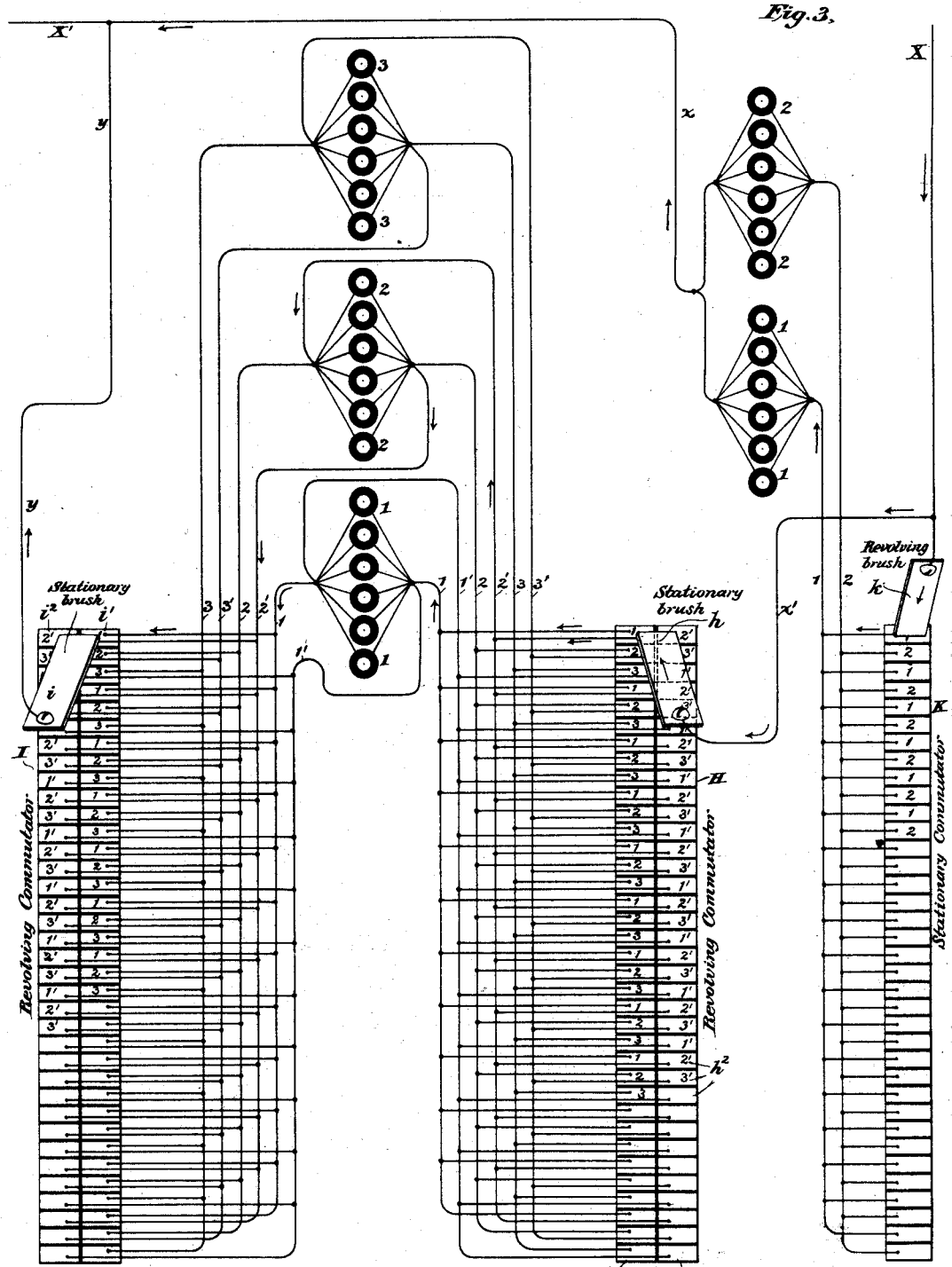

UNITED STATES PATENT OFFICE.

EDWARD B. PARKHURST, OF WOBURN, MASSACHUSETTS, ASSIGNOR TO THE FLORENCE MOTOR COMPANY, OF MAINE.

ELECTRIC MOTOR.

SPECIFICATION forming part of Letters Patent No. 422,149, dated February 25, 1890.

Application filed September 10, 1889. Serial No. 323,532. (No model.)

*To all whom it may concern:*

Be it known that I, EDWARD B. PARKHURST, of Woburn, Middlesex county, State of Massachusetts, have invented certain new and useful Improvements in Electric Motors, of which the following is a specification.

My invention relates to the class of electric motors described in an application filed by me August 14, 1889, in which there are multiple magnets or coils in the field and armature, and groups of magnets in the armature are successively caused to act in conjunction with groups of magnets in the field when the respective poles of the groups of magnets are so related to each other as to produce a maximum effect from the current, each group of armature-magnets acting two or more times in connection with similar groups in the field during each revolution. By such an organization I am enabled to utilize the full power of the current to the greatest advantage by causing it to energize at one time those magnets or coils only which sustain the most favorable relation to each other, the groups of magnets in field and armature being successively thrown into action as they come into the most advantageous position. My present invention contemplates a like organization; but I utilize to produce rotation not only the attraction of approaching poles, but also the repulsion of receding poles.

In the accompanying drawings, Figure 1 is a side elevation; Fig. 2, a longitudinal section showing a motor-pulley organized according to my invention, and Fig. 3 is a diagram view illustrating the various circuit-connections.

In the present instance the rotating or armature magnets are shown as revolving around the stationary or field magnets. The armature-magnets M are mounted upon the interior of a revolving pulley-rim B', carried by a hub B on a rotating shaft A', supported in bearings in a frame A. The magnets shown are double-pole or horseshoe magnets and have their poles arranged at right angles to the wheel-rim, eighteen such magnets being shown. Similar stationary or field magnets M' are carried upon and project radially from the hub B², secured upon the frame A.

The revolving hub and wheel-rim B B' carry two commutators H and I. Each commutator has double rows of insulated commutator-strips, there being thirty-six strips in the present instance in each row. A brush $i$, mounted upon the frame A, bears upon the commutator I and is broad enough to make contact with both rows of strips, and a brush $h$, mounted upon the interior of the stationary hub B², bears upon the commutator H and is likewise of sufficient width to make contact with both rows of strips. A third commutator K, a stationary one, having a single row of thirty-six insulated strips, is carried by the frame A, and a brush $k$, carried by the rotating axle A', travels upon it. The stationary magnets M' are connected in two groups, each group comprising alternate magnets in the series, the magnets of one group being numbered 1 and the magnets of the other group numbered 2. The connections appear more plainly from the diagram, where the magnets of each group are brought together for convenience of illustration; but Fig. 1 shows the alternate arrangement of the magnets composing the groups. All the magnets of the stationary field marked 1 are connected with the alternate strips of the commutator K, said strips being correspondingly marked 1. All the magnets of group 2 are connected with the remaining alternate commutator-strips of commutator K, the strips being marked 2. Current from the line X enters the revolving brush $k$ by a rubber $k'$, Figs. 1 and 2, and passes through either group 1 or group 2 of the stationary field-magnet, accordingly as the commutator-brush $k$ is resting upon a strip numbered 1 or a strip numbered 2, and from thence the current passes by wire $x$ to the main conductor X'. A branch wire $x'$ from the line X leads currents to the brush $h$ of the commutator H. The magnets of the revolving field are numbered consecutively 1 2 3 in six consecutive series. All the magnets numbered 1 constitute one group, those marked 2 another group, and those marked 3 another group, and the magnets of each group are connected to correspondingly numbered and selected commutator-strips in the row of strips $h'$ of the commutator H. This connection between each group of magnets and its commutator-strips is such that the current entering at the brush $h$ is led to or enters the magnet-coils in a sense or direction to produce polarities the reverse of the polarities produced in the stationary or field magnets. The groups of magnets 1 2 3 of the revolving armature are severally connected on their opposite sides with correspondingly numbered and selected commutator-strips in the row of strips $i'$ of the commutator I, the circuit being completed through the brush $i$ and by wire $y$ to the line X'.

With the circuit-connections thus far described, if the commutator-brushes are resting upon strips numbered 1 the group 1 of stationary field-magnets and the group 1 of magnets in the revolving armature will be energized and attract each other, producing rotation of the pulley-rim in the direction indicated by the arrow. As the commutator brushes are transferred to the strips numbered 2 the groups 2 2 are active and attract each other. Continued motion transfers the brush $k$ to a strip numbered 1, and brushes $h$ and $i$ to strips numbered 3. Consequently groups 1 in the field and 3 in the armature are active. In like manner group 2 in the field and 1 in the armature act, and so on. The winding, of course, for the circuit-connections above described is such that the magnets in the groups are polarized in a sense to attract each other, as above suggested. The groups 1 2 3 of the revolving armature are however connected with the commutator-strip in the rows of strip $h^2$ $i^2$ in such a manner as to be reversely polarized at certain times; or, in other words, to be polarized in a sense to repel the groups 1 2 of the stationary field. The commutator-strips in the rows $h^2$ and $i^2$ are numbered consecutively in series $1'$ $2'$ $3'$, corresponding with the armature-magnets 1 2 3; but in the commutator H strip $2'$ is opposite strip 1 of the row $h'$, strip $3'$ opposite strip 2, and strip $1'$ opposite strip 3. The arrangement is the same in the commutator I. All the magnets of group 1 in the armature are connected on one side with the strips $1'$ in the commutator H and on the other side with strips $1'$ in the commutator I. The armature-groups 2 and 3 are similarly connected, and the direction of the circuit from the brush $h$ to the brush $i$ is such as to polarize the group 1 2 2 in an opposite sense to that in which they are polarized when the current passes through them, as already described, from the strips 1 2 3. The result of this arrangement, as will be plain from the diagram, is that when the groups 1 1 in field and armature are attracting each other, group 2 in the armature will be repelling group 1 in the field, and thus adding to the force tending to produce rotation. In like manner when groups 2 2 are attracting each other, group 3 in the armature is repelling group 2 in the field, and when group 1 in the field and group 3 in the armature are attracting each other, group 1 in the armature is repelling group 1 in the field, and so on. This will be plain from the diagram, where the circuit-connections may be traced as follows: current entering at X passes by brush $k$ and commutator-strip 1 through the group 1 of field-coils and by wire $x$ to the main line X'. At the same time current also passes by line $x'$ to brush $h$, strip 1 of commutator H through the group of coils numbered 1 in a direction to produce attraction between the groups 1 1, thence by commutator-strip 1 of commutator I, brush $i$, and wire $y$ to the line X'. At the same time current passes from the brush $h$ through commutator-strip $2'$ to the group of armature-magnets 2 in a direction to produce polarities therein that will repel the group 1 in the stationary field, and from thence to commutator-strip $2'$ of commutator I, and by brush $i$ and wire $y$ to the line X'. These conditions are also shown in Fig. 1, where the magnets are marked to indicate the operation. A similar result takes place as the brushes are transferred to succeeding strips of the commutators K H I.

The above is sufficient to illustrate the invention.

I do not, of course, limit myself to magnets or coils of any particular form or to any particular number of magnets, or to the special arrangement of commutators and circuit-connections shown and described.

I am aware that it is old, broadly speaking, to utilize the attractive and repulsive effects of sets of single magnets arranged in series and revolving past each other, and do not broadly claim producing such results; but,

Having thus fully described the construction, organization, and operation of my improved electric motor, what I claim therein as new and of my own invention is—

1. The combination, substantially as hereinbefore set forth, of a series of groups of armature-magnets and a corresponding series of groups of field-magnets, both arranged concentrically and circumferentially around a common axis, about which at least one set of magnets revolves past and co-operates with all the groups of the other set in succession in each revolution, with circuit-connections and commutators so organized as to automatically shift the current successively through the corresponding magnets of each group, and to utilize both their attractive and repulsive effects to produce a continuous pull on the magnets in the direction of their rotation.

2. The combination, substantially as hereinbefore set forth, of series of groups of radial armature-magnets, and a corresponding series of groups of radial field-magnets, both arranged concentrically in parallel planes with their poles end to end around a common axis, about which at least one set of magnets revolves past and successively co-operates with all the groups of the opposed set, with circuit-connections, commutators, and automatic mechanism for shifting the current through the appropriate corresponding
5 magnets of the opposed set of groups to produce a continuous pull on the magnets both by attraction and repulsion.

In testimony whereof I have hereunto subscribed my name.

EDWARD B. PARKHURST.

Witnesses:
WM. A. MACLEOD,
C. E. NOLTE.